United States Patent
Powers, III (10) Patent No.: US 10,815,731 B2
(45) Date of Patent: Oct. 27, 2020

(54) METHOD AND APPARATUS FOR EMPLACING COLUMNS

(71) Applicant: John Powers, III, Phoenix, AZ (US)

(72) Inventor: John Powers, III, Phoenix, AZ (US)

(*) Notice: Subject to any disclaimer, the term of this patent is extended or adjusted under 35 U.S.C. 154(b) by 0 days.

(21) Appl. No.: 16/361,019

(22) Filed: Mar. 21, 2019

(65) Prior Publication Data

US 2019/0218862 A1 Jul. 18, 2019

Related U.S. Application Data

(63) Continuation-in-part of application No. 15/946,091, filed on Apr. 5, 2018, now Pat. No. 10,246,944, and a continuation-in-part of application No. 15/817,857, filed on Nov. 20, 2017, now Pat. No. 10,323,377.

(51) Int. Cl.
*E21B 7/24* (2006.01)
*B23P 19/033* (2006.01)
*E04H 12/34* (2006.01)
*E04H 12/22* (2006.01)

(52) U.S. Cl.
CPC ............ *E21B 7/24* (2013.01); *B23P 19/033* (2013.01); *E04H 12/2215* (2013.01); *E04H 12/34* (2013.01)

(58) Field of Classification Search
CPC ........ E21B 7/24; E04H 12/34; E04H 12/2215
See application file for complete search history.

(56) References Cited

U.S. PATENT DOCUMENTS

| | | | | |
|---|---|---|---|---|
| 3,530,947 A * | 9/1970 | Gendron | ............ | E02D 1/04 175/55 |
| 3,693,364 A * | 9/1972 | Bodine | ............ | E02D 7/18 405/245 |
| 4,403,665 A * | 9/1983 | Bodine | ............ | E02D 7/18 175/394 |
| 4,436,452 A * | 3/1984 | Bodine | ............ | E02D 7/18 173/49 |
| 4,565,251 A * | 1/1986 | Cischke | ............ | E02D 13/10 173/128 |
| 4,614,070 A * | 9/1986 | Idland | ............ | E04H 12/2253 52/295 |
| 5,088,564 A * | 2/1992 | Kobayashi | ............ | E02D 7/10 173/1 |
| 5,256,006 A * | 10/1993 | Harding | ............ | E04H 12/2284 173/130 |
| 5,653,556 A * | 8/1997 | White | ............ | E02D 7/18 173/162.1 |
| 6,896,071 B1 * | 5/2005 | Collins | ............ | E02D 7/20 173/1 |
| 7,080,958 B1 * | 7/2006 | Morris | ............ | E02D 7/18 173/162.1 |
| 7,392,855 B1 * | 7/2008 | White | ............ | E02D 7/10 173/135 |
| 2009/0168597 A1 * | 7/2009 | Wu | ............ | E21B 47/0005 367/35 |

(Continued)

Primary Examiner — Paolo Agudelo
(74) Attorney, Agent, or Firm — Parsons & Goltry; Robert Parsons; Michael Goltry (57) ABSTRACT

A sonic drilling apparatus with adapter for emplacing columns includes a sonic drilling apparatus generating vibrational waves and having a fitting. An adapter is coupled to the fitting for removably attaching a column to the sonic drill apparatus. A centering assembly is positioned below the adaptor for receipt of a column therethrough.

2 Claims, 14 Drawing Sheets

(56) References Cited

U.S. PATENT DOCUMENTS

2014/0356076 A1* 12/2014 Hale ...................... E02D 5/223
405/255
2017/0335538 A1* 11/2017 Lindeman ................ E02D 7/18

* cited by examiner

FIG. 15

METHOD AND APPARATUS FOR EMPLACING COLUMNS

CROSS-REFERENCE TO RELATED APPLICATION

This application is a Divisional Application of U.S. patent application Ser. No. 15/946,091, filed November 5 April 2018 which is a Continuation-In-Part of U.S. patent application Ser. No. 15/817,857, filed Nov. 20, 2017, which claims the benefit of U.S. Provisional Application No. 62/424,708, filed 21 Nov. 2016 and U.S. Provisional Application No. 62/429,704, filed 2 Dec. 2016.

FIELD OF THE INVENTION

This invention relates to construction equipment and methods.

More particularly, the present invention relates to methods and equipment for emplacing columns in a surface.

BACKGROUND OF THE INVENTION

In the field of construction, emplacing columns for a structure, such parking shade structures, requires a great deal of labor. The columns must be properly positioned, a hole must be dug to receive the column, the column inserted into the hole and the hole backfilled. While backfilling, the column must remain properly positioned, and the backfill must be strong enough to support the column and structure of which it is a part. The time and effort needed to emplace columns is substantial, resulting in high costs for this kind of construction.

It would be highly advantageous, therefore, to remedy the foregoing and other deficiencies inherent in the prior art.

An object of the present invention is to provide apparatus and method for quickly and easily emplacing columns.

SUMMARY OF THE INVENTION

Briefly, to achieve the desired objects and advantages of the instant invention, provided is a sonic drilling apparatus with adapter for emplacing columns. Included is a sonic drilling apparatus generating vibrational waves and including a fitting. An adapter is coupled to the fitting for removably attaching a column to the sonic drill apparatus.

The adapter can include a base having a coupling fixture extending upwardly therefrom and coupled to the fitting. A coupling mechanism extends downwardly from the base for attachment to the column. A centering assembly can also be provided. The centering assembly includes a track carried by sonic drill apparatus, a carriage carried by and reciprocal moveable laterally along the track, and a centering frame including a base coupled to and extending from the carriage. The centering frame can include a first portion having an end pivotally coupled to the base and a second portion having an end pivotally coupled to the base in opposition to the first portion. The first portions and the second portion are each pivotally movable between an open position and a closed position.

Also provided is a method of emplacing a column. The method includes the steps of providing a sonic drilling apparatus generating vibrational waves and including a fitting. Providing an adapter coupled to the fitting for removably attaching a column to the sonic drill apparatus, and providing a centering assembly positioned below the adaptor for receipt of a column therethrough. The adapter is attached to the column to the column. The centering assembly is positioned around the column to prevent lateral movement thereof, and the column is driven into a supporting substrate to a depth desired and sufficient to provide stability to the column.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
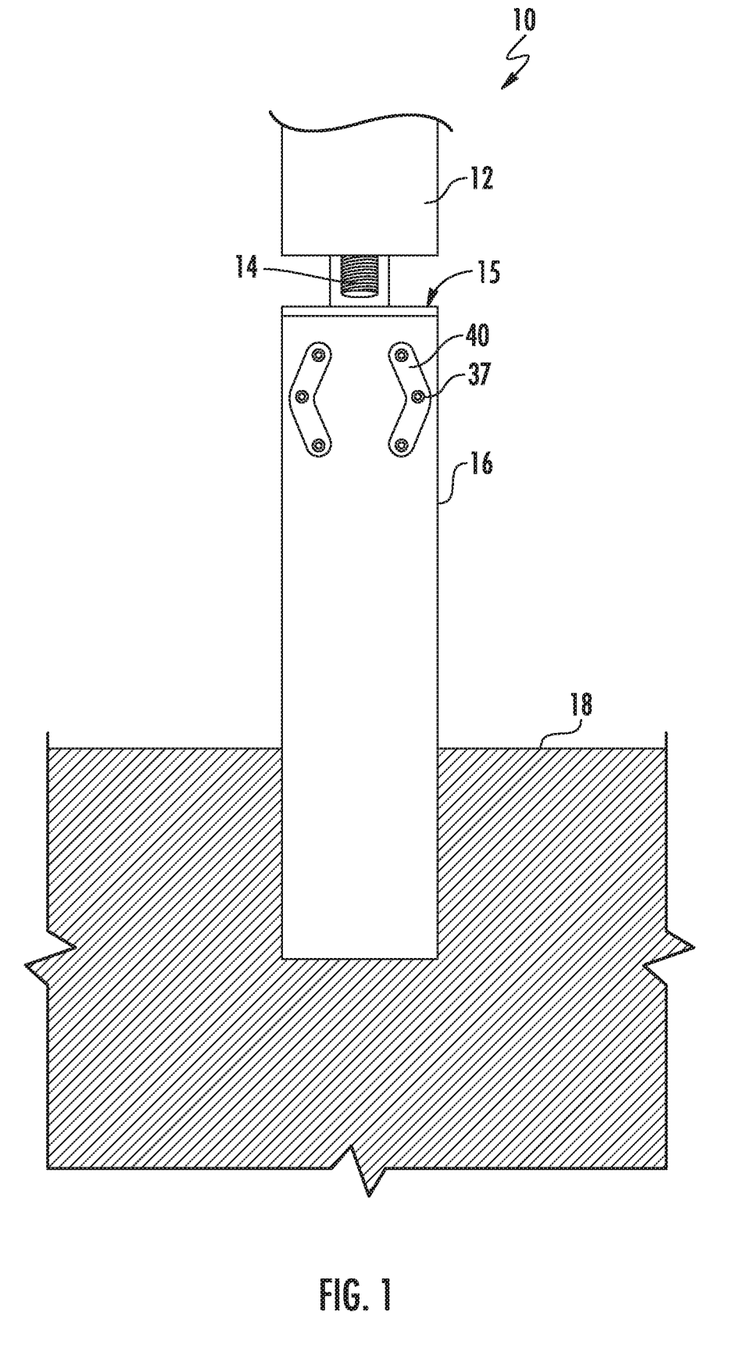
FIG. 1 is a partial simplified schematic of a sonic drilling apparatus and column according to the present invention.

Turning now to the drawings in which like reference characters indicate corresponding elements throughout the several views, attention is directed to FIG. 1 which illustrates a sonic drilling apparatus generally designated 10. Sonic drilling apparatus 10 includes an orbiting mass oscillator 12, or like mechanism for causing vibrational waves, having a fitting such as a threaded fitting 14 to which drill casings have been conventionally attached. While the orbiting mass oscillator 12 operates in a conventional manner, it only provides vibrational waves and does not rotate the column as a conventional sonic drill requires. An adapter 15, according to the present invention, is provided for use in attaching a column (also can be referred to as a post) to sonic drill apparatus 10. While substantially any column can be employed, the preferred columns include substantially any tubular polygonal column such as square or rectangular tubular columns, or structural beams such as I-beams. In this embodiment, a tubular column made from the joining of two C-shaped elements is preferred. The tubular column preferably employed is disclosed in U.S. Pat. No. 9,394,689, issued Jul. 19, 2016, and incorporated herein by reference.

Sonic drilling apparatus 10 is utilized to drive column 16 into a supporting substrate 18 such as earth. In operation, column 16 can be driven through typical soil, concrete, asphalt and other substrates 18. By using resonant sonic drilling methods an oscillator is adapted to transmit sinusoidal pressure waves through column 16 to create a cutting action at the lower edge. The pressure waves are typically created by two counter-rotating, offset balance roller weights each having an eccentric axis located in the orbiting mass oscillator 12. Frequencies close to the natural frequency of column 16 are generated, thereby causing the column to vibrate elastically along its longitudinal axis. In the resonant condition, the column stores and releases energy, thereby generating large forces between the lower edge and the substrate. It will be understood that sonic drilling apparatus 10 can be carried by a drill vehicle, mounted on a tripod or other structure, and the like. These structures carrying sonic drilling apparatus 10 allow for transportation of apparatus 10 as well as accurate placement of column 16.

Figure 2:
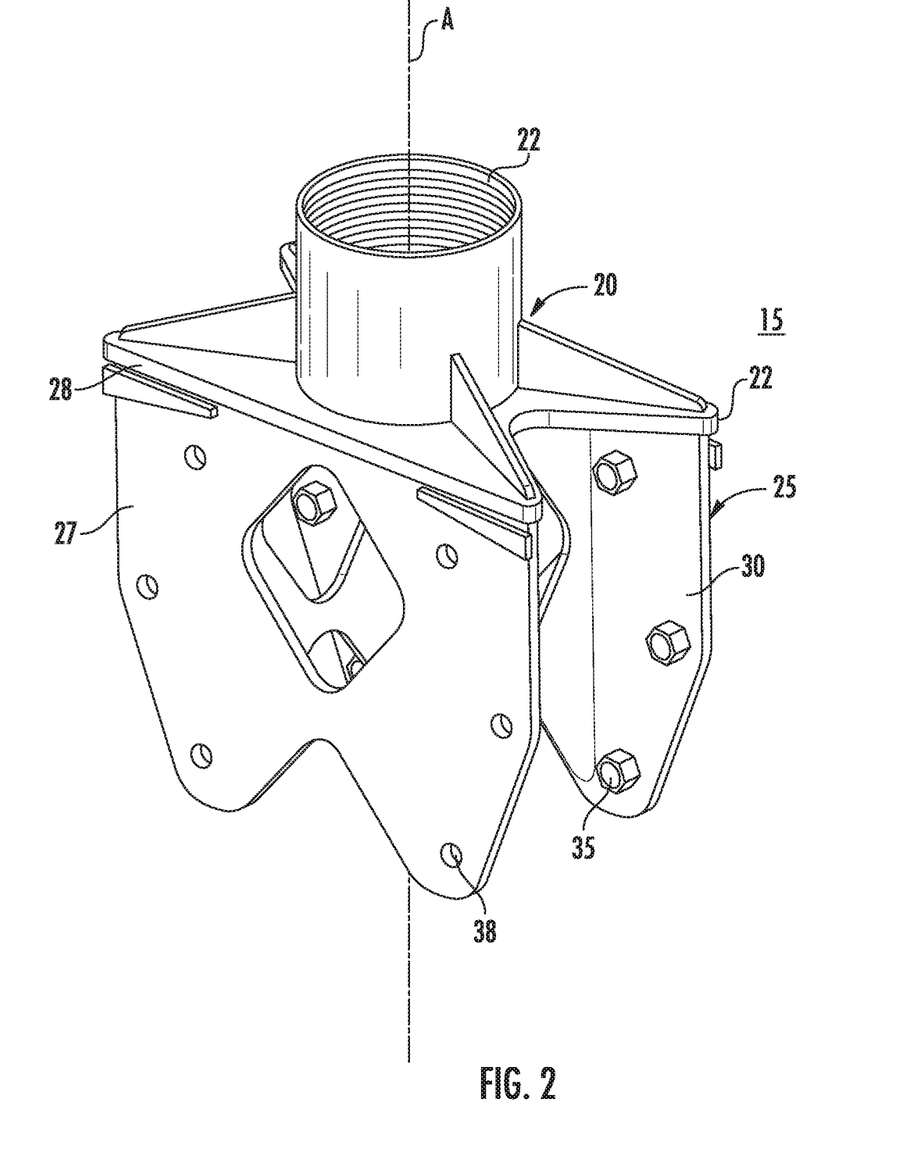
FIG. 2 is a perspective view of an adapter for attaching a column to a sonic drilling apparatus according to the present invention.

Turning now to FIG. 2, adapter 15 is illustrated. Adapter 15 includes a base 20 having a threaded socket 22, couplable to threaded fitting 14, extending upwardly from one side and a coupling mechanism 25 extending downwardly from the opposing side along an axis A. It will be understood that while a threaded fitting is preferred, other fittings for allowing coupling of adapter 15 can be employed, such as quick connect fasteners, bayonet style couplings, mating flanges bolted together, and the like. Coupling mechanism 25 includes a plate 27 extending from an edge 28 of base 20 parallel to axis A, and a plate 30 extending from an edge 32 of base 20 parallel to axis A. Plate 27 and plate 30 are parallel and spaced apart with respect to one another, and sized to be received within the top end of column 16.

Figure 3:
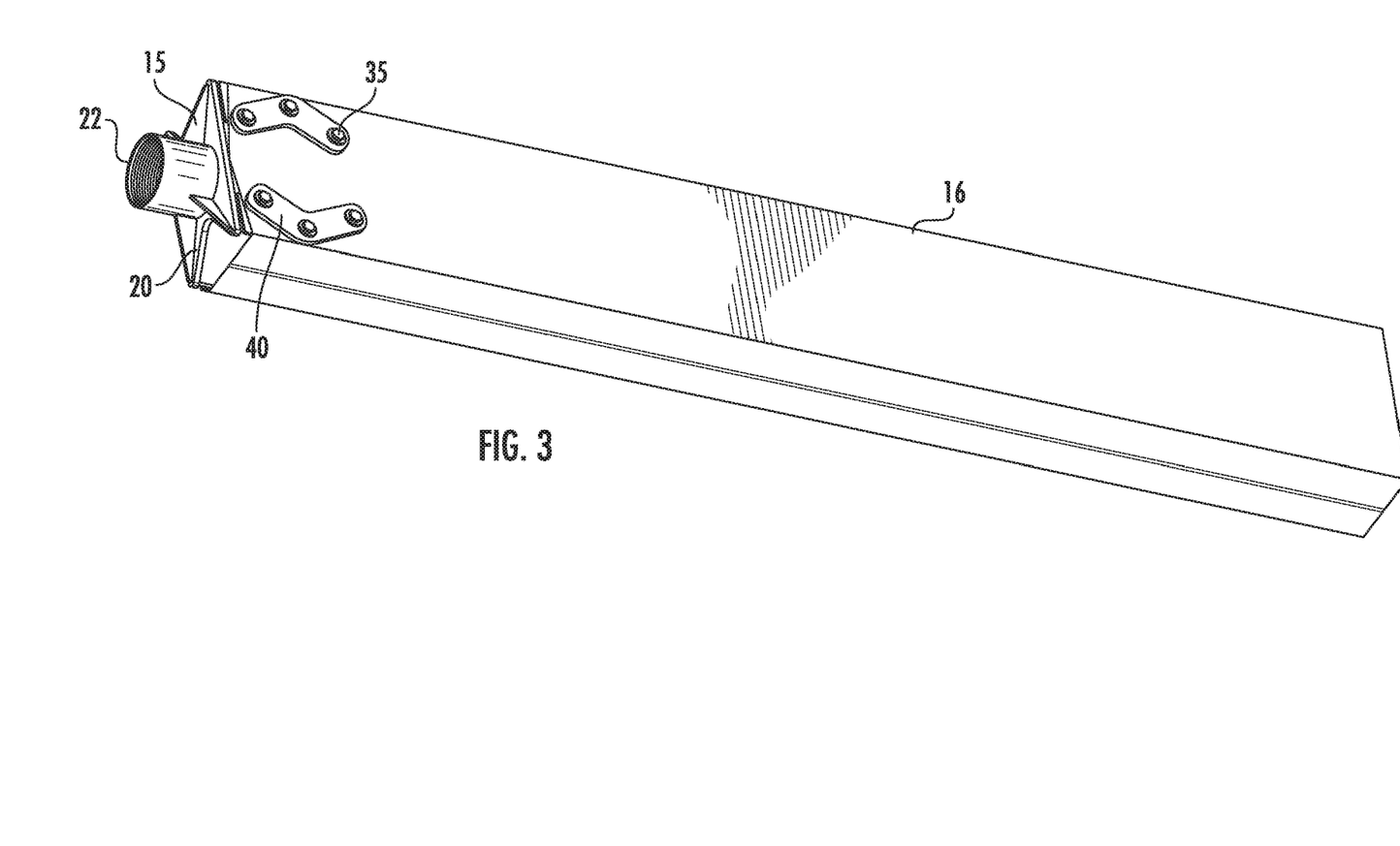
FIG. 3 is a perspective view of an adapter attached to a column for attachment to a sonic drilling apparatus according to the present invention.

With additional reference to FIG. 3, when received within column 16, plate 27 and plate 30 lie against opposing sides thereof and are fixed in position by fasteners 35 extending concurrently through apertures 37 in the sides of column 16 and apertures 38 formed in plates 27 and 30. Brackets 40 are positioned on the outer surface of the sides of column 16 to reinforce the sides of column 16 and act as washers to prevent damage to column 16.

In operation, a column 16 is coupled to adapter 15. Adapter 15 is then coupled to orbiting mass oscillator 12 by attachment to threaded fitting 14. Column 16 is then positioned over the location in which it is to be emplaced, and using the sonic drilling apparatus, driven vertically into the substrate to a depth desired and sufficient to provide stability to column 16. Column 16 is not rotated, but simply driven vertically downward. Column 16 is then employed as a column for the construction of a structure such as a parking structure, shade structure, building and the like. By employing sonic drill technology to emplace columns, holes need not be dug, and filler need not be replaced after positioning the column. The column is simply inserted through the substrate, which closely engages the column preventing removal thereof without the additional use of the sonic drill apparatus. Column 16 is driven into the substrate when the correct frequency is achieved for the material of the column to resonate.

To achieve an emplaced column, column 16 is at least 128 thousandths of an inch thick and preferably in the range of 128 to 150 thousandths of an inch thick. The material of column is steel being a high strength steel in the range of 85-100 KSI. The thickness and hardness scales are required to prevent welds forming column 16 from tearing loose, and to prevent the forces generated by sonic drilling apparatus 10 from damaging column 16.

Figure 4:
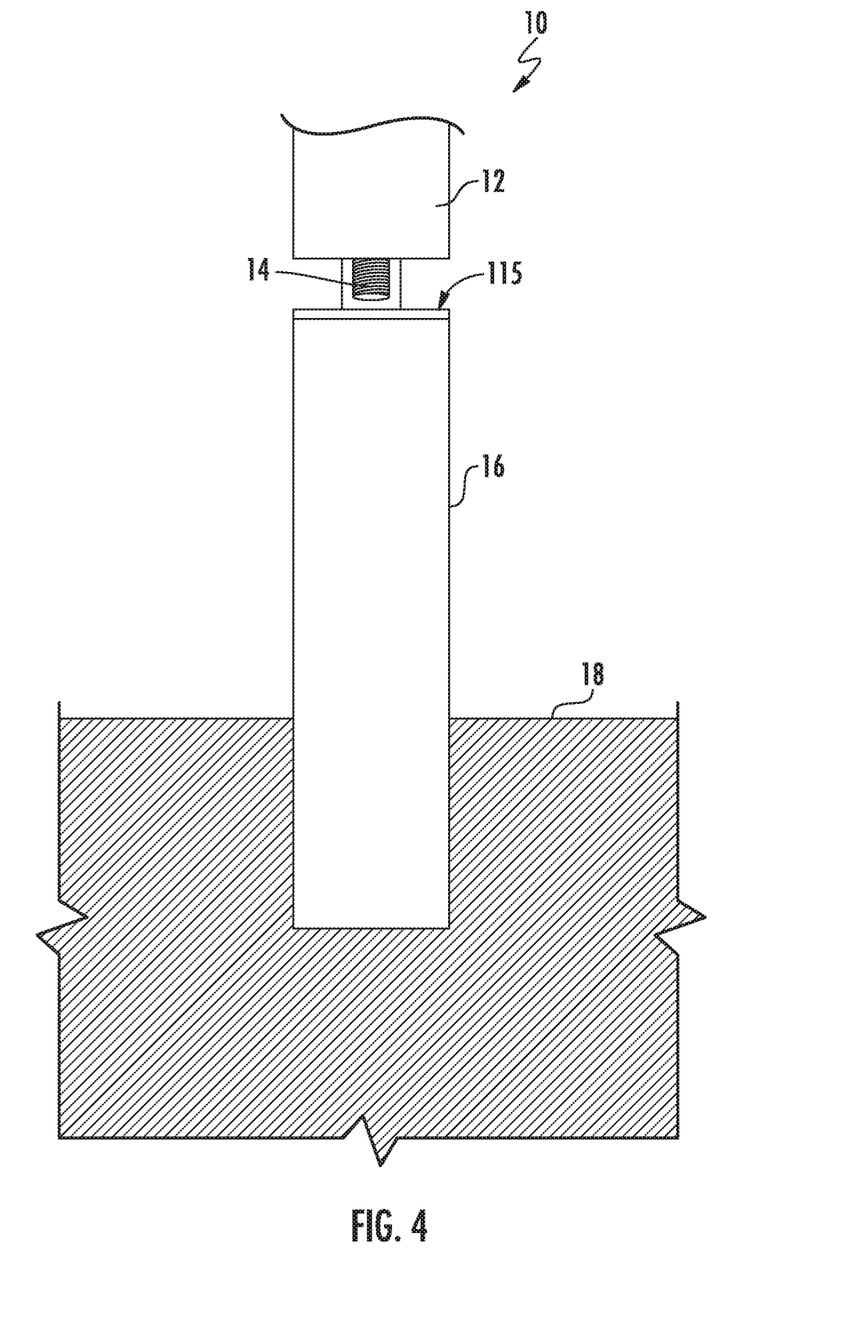
FIG. 4 is a partial simplified schematic of a column coupled to a sonic drilling apparatus by another embodiment of an adapter according to the present invention.

Turning now to FIG. 4, illustrated is sonic drilling apparatus 10 which includes orbiting mass oscillator 12 having a threaded fitting 14, to which drill casings have been conventionally attached, and another embodiment of an adapter 115. As with adapter 15, adapter 115 is provided for use in attaching tubular polygonal column 16 to sonic drill apparatus 10. As discussed previously, while substantially any polygonal column can be employed, square or rectangular tubular columns having opposed planar surfaces are preferred. Sonic drilling apparatus 10 with adapter 115 is utilized in the same manner as with adapter 15 described previously.

Figure 5:
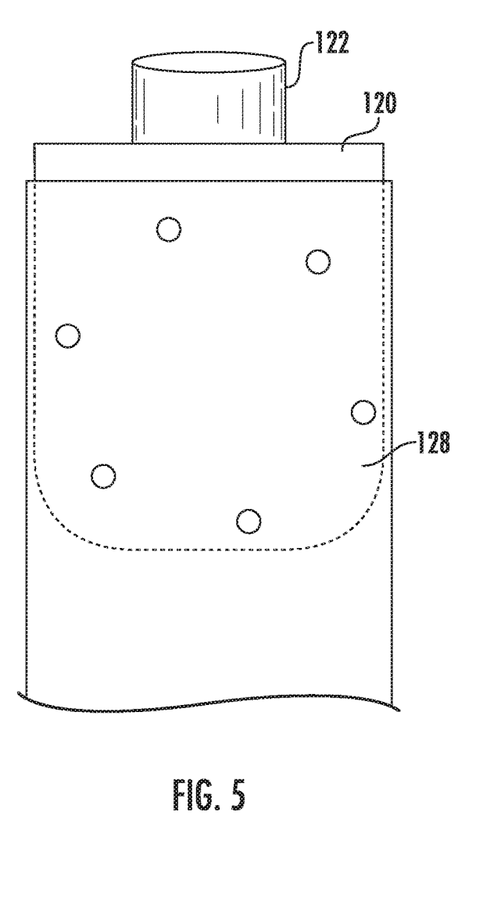
FIG. 5 is a side view of an adapter for attaching a column to a sonic drilling apparatus according to the present invention.
Figure 6:
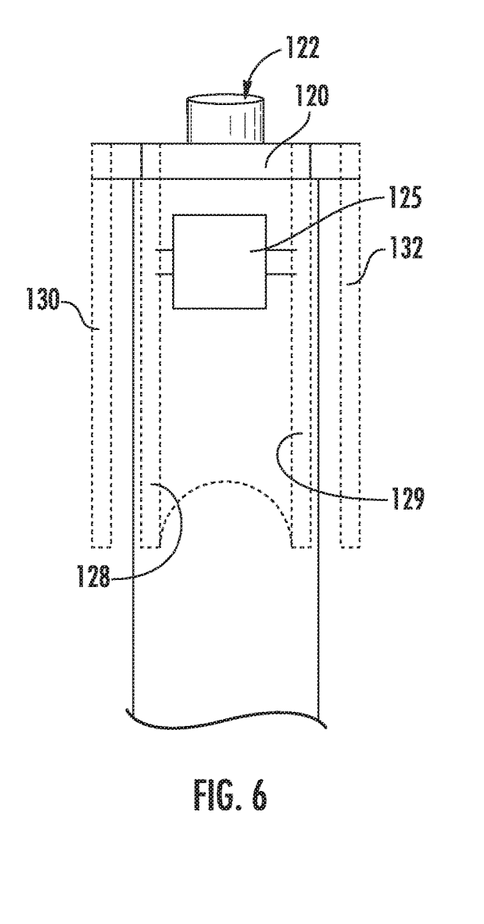
FIG. 6 is a sectional side view of an adapter attached to a column for attachment to a sonic drilling apparatus according to the present invention.

Turning now to FIGS. 5 and 6, adapter 115 is illustrated. Adapter 15 includes a base 120 having a threaded socket 122, couplable to threaded fitting 14, extending from one side and carrying an expansion mechanism such as a hydraulic cylinder 125. While a hydraulic cylinder is preferred, other expansion mechanisms such as pneumatic cylinders, mechanical wedges and the like, can be employed. Hydraulic cylinder 125 is employed to drive at least one and preferably two opposing plates 128 and 129 between an engaged position and a disengaged position. In operation, adapter 115, with plates 128 and 129 in the disengaged position, is inserted into the top end of column 16 with plates 128 and 129 positioned adjacent inner surfaces of opposing sidewalls of column 16. Hydraulic cylinder 125 is then actuated to move plates 128 and 129 outwardly to the engaged position. In the engaged position, plates 128 and 129 are pressed against the inner surfaces of column 16, securely holding adapter 115 to column 16. In this manner, column 16 is securely retained by adapter 115 which is then couple to sonic drilling apparatus 10, allowing the vibrations to pass into column 16.

Still referring to FIG. 6, plates 128 and 129 can be replaced by or augmented with opposing plates 130 and 132 positioned outside column 16. If desired, when replacing plates 128 and 129 with plates 130 and 132, the sides of column 16 can be supported by stationary plates such as plates 27 and 30 of adapter 15 positioned inside column 16. In both cases, whether replacing or augmenting plates 128 and 129, and whether or not inside plate are used, the expansion mechanism is employed to drive opposing plates 130 and 132 between an engaged position and a disengaged position. In operation, adapter 115, with plates 130 and 132 in the disengaged position, is inserted onto the top end of column 16 with plates 130 and 132 positioned adjacent outer surfaces of opposing sidewalls of column 16. Hydraulic cylinder 125 is then actuated to move plates 130 and 132 inwardly to the engaged position. In the engaged position, plates 130 and 132 are pressed against the outer surfaces of column 16, securely holding adapter 115 to column 16.

Referring to FIGS. 5 and 6, when received within column 16, plates 128 and 129 lie against opposing sides thereof and are fixed in position by the pressure generated by the expanded hydraulic cylinder. In this manner, column 16 can be quickly released from engagement by adapter 115 and can be quickly engaged by adapter 115. With adapter 115 engaged with column 16, adapter 115 is then coupled to orbiting mass oscillator 12 by attachment to threaded fitting 14. Column 16 can then be positioned over the location in which it is to be emplaced, and using the sonic drilling apparatus, driven into the substrate to a depth desired and sufficient to provide stability to column 16. Column 16 is then employed as a column for the construction of a structure such as a parking structure, shade structure, building and the like. By employing sonic drill technology to emplace columns, holes need not be prepared, and filler need not be replaced after positioning the column. The column is simply inserted through the substrate, which closely engages the column preventing removal without the additional use of the sonic drill apparatus. Column 16 is driven into the substrate when the correct frequency is achieved for the material of the column to resonate.

Figure 7:
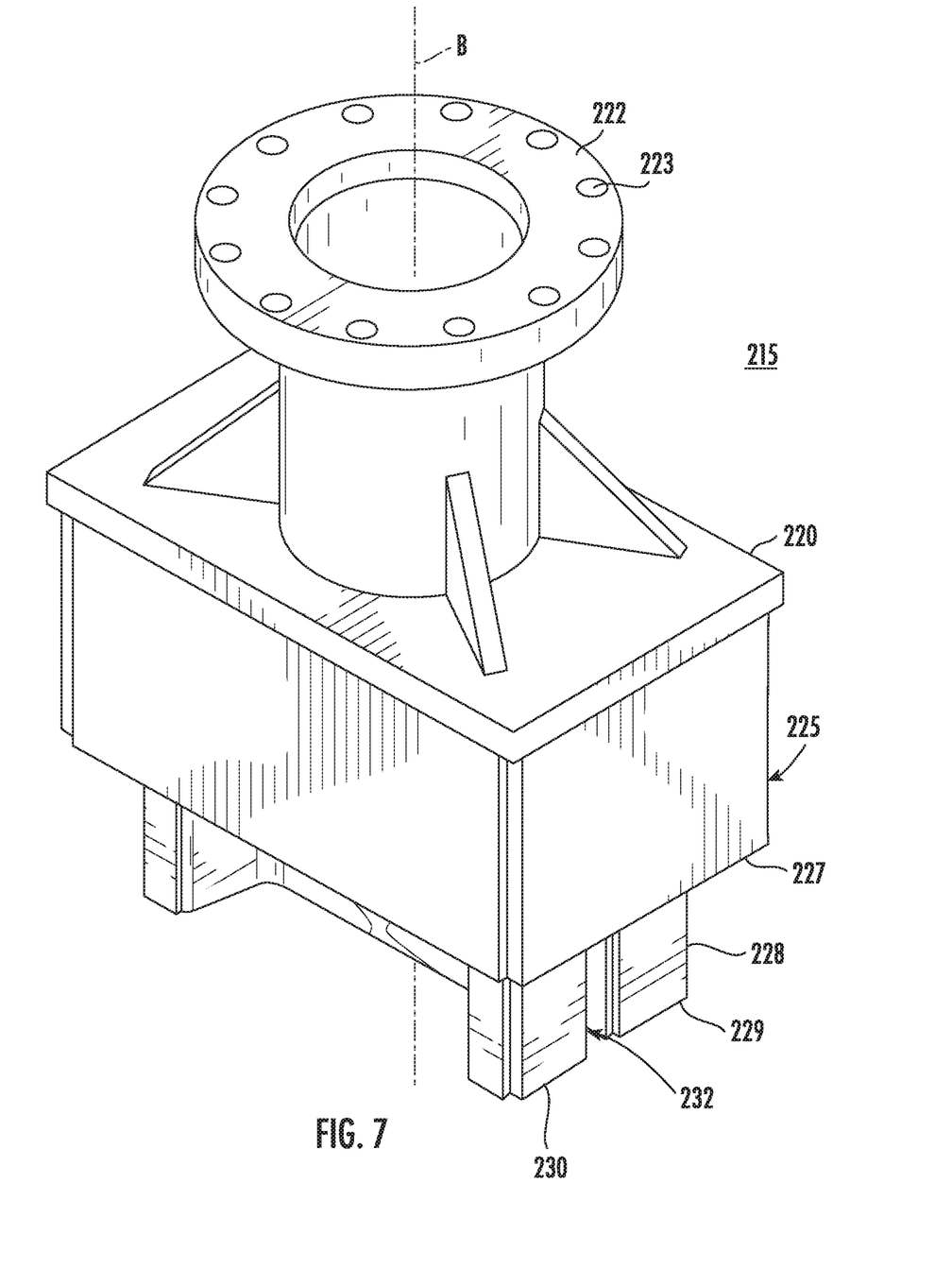
FIG. 7 is a perspective view of an adapter for attaching an I-beam used as a column to a sonic drilling apparatus according to the present invention.
Figure 8:
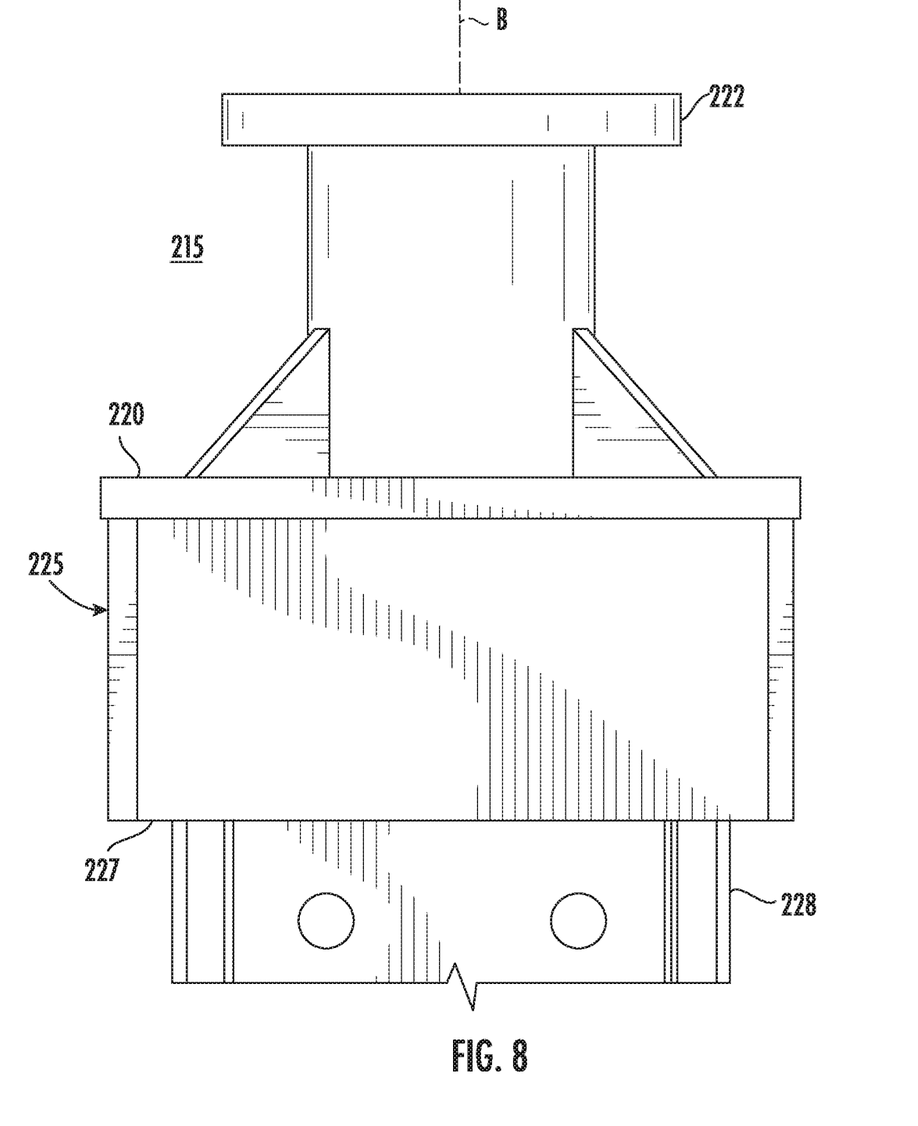
FIG. 8 is a side plan view of the adapter of FIG. 7.
Figure 9:
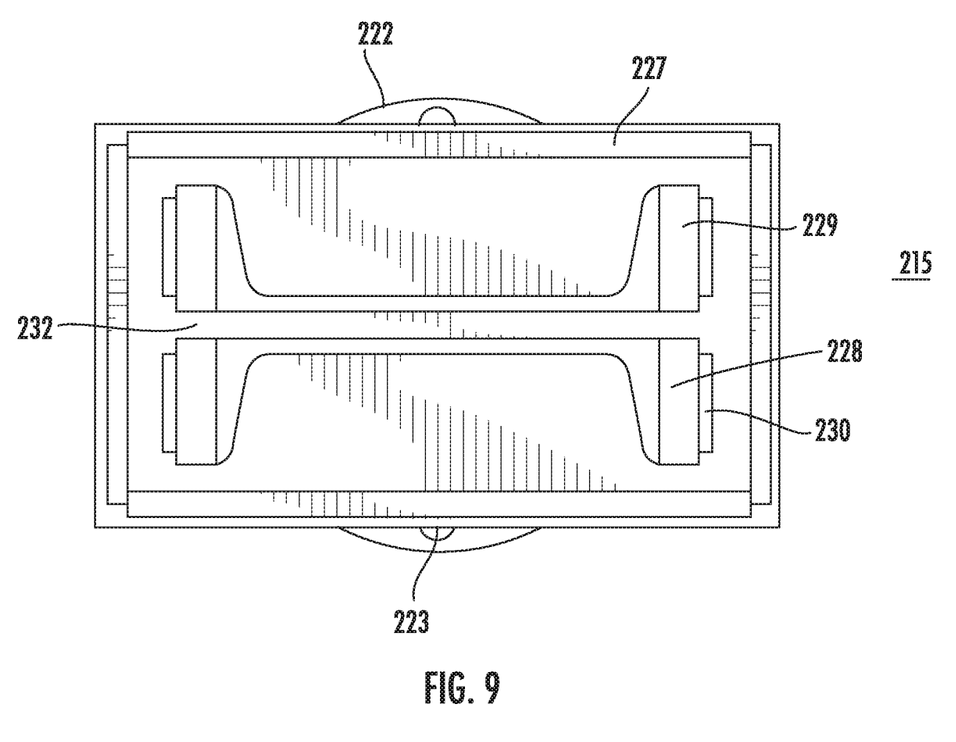
FIG. 9 is a bottom view of the adapter of FIGS. 7 and 8.

Turning now to FIGS. 7, 8 and 9, an adapter 215 is illustrated. Adapter 215 includes a base 220 having a coupling fixture such as a threaded socket and the like, as shown in previous embodiments. In this embodiment, adapter 215 is illustrated having a fitting including a flange 222 positioned upwardly from one side of base 220 and a coupling mechanism 225 extending downwardly from the opposing side along an axis B. A plurality of bolt holes 223 are formed through flange 222 to match a similar fitting carried by the sonic drill apparatus which would replace threaded fitting 14. In this manner, adapter 215 can be fixedly and securely coupled to the sonic drill apparatus. It will be understood that while mating flanges bolted together are used in the present embodiment, other fittings for allowing coupling of adapter 215 can be employed, such as quick connect fasteners, bayonet style couplings, a threaded fitting, and the like. Coupling mechanism 25 includes a socket 227 extending from base 220 parallel to axis B. Socket 227 is shaped to receive the end of an I-beam therein. An insert member 228 extends from socket 227 and is shaped to be received between the webbing and flanges of the end of an I-beam. Insert member 228 includes a first u-shaped portion 229 received between the web and flanges of an I-beam on one side, and a second portion 230 received between the web and flanges of an I-beam on an opposing side. Portion 229 and portion 230 are separated by a gap 232 sized to receive the web of the end of an I-beam therein.

Figure 10:
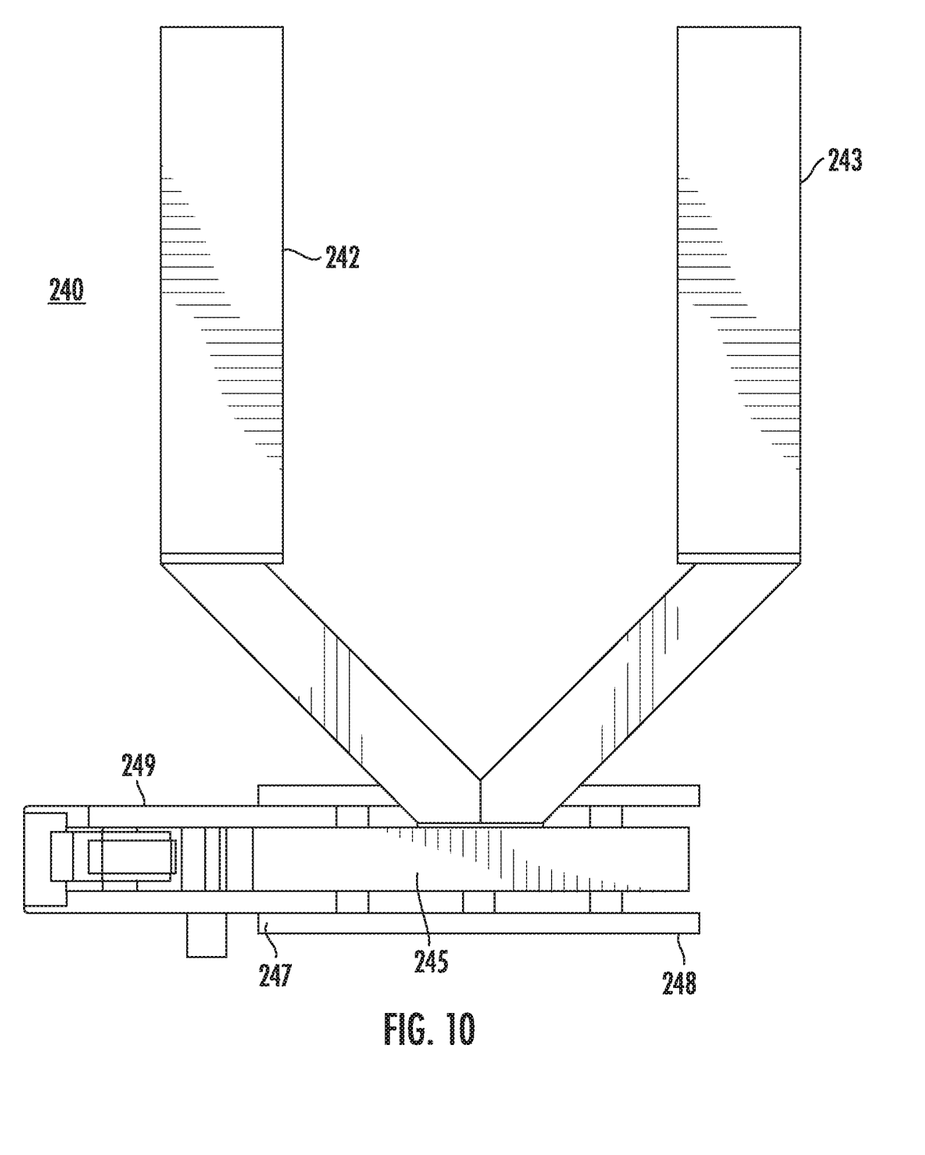
FIG. 10 is a side view of a clamp mechanism for engaging the column, according to the present invention.
Figure 11:
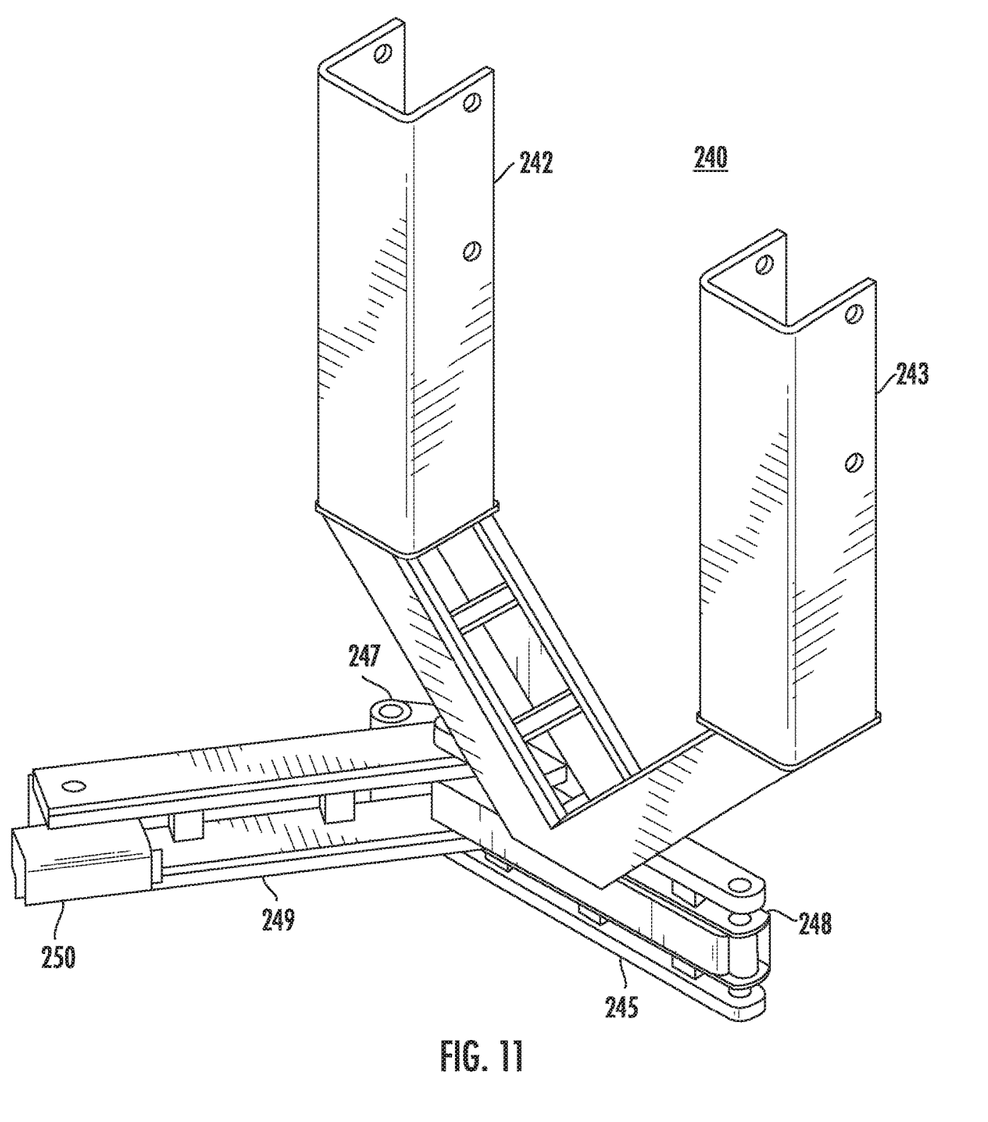
FIG. 11 is a perspective view of the clamp mechanism of FIG. 10.
Figure 12:
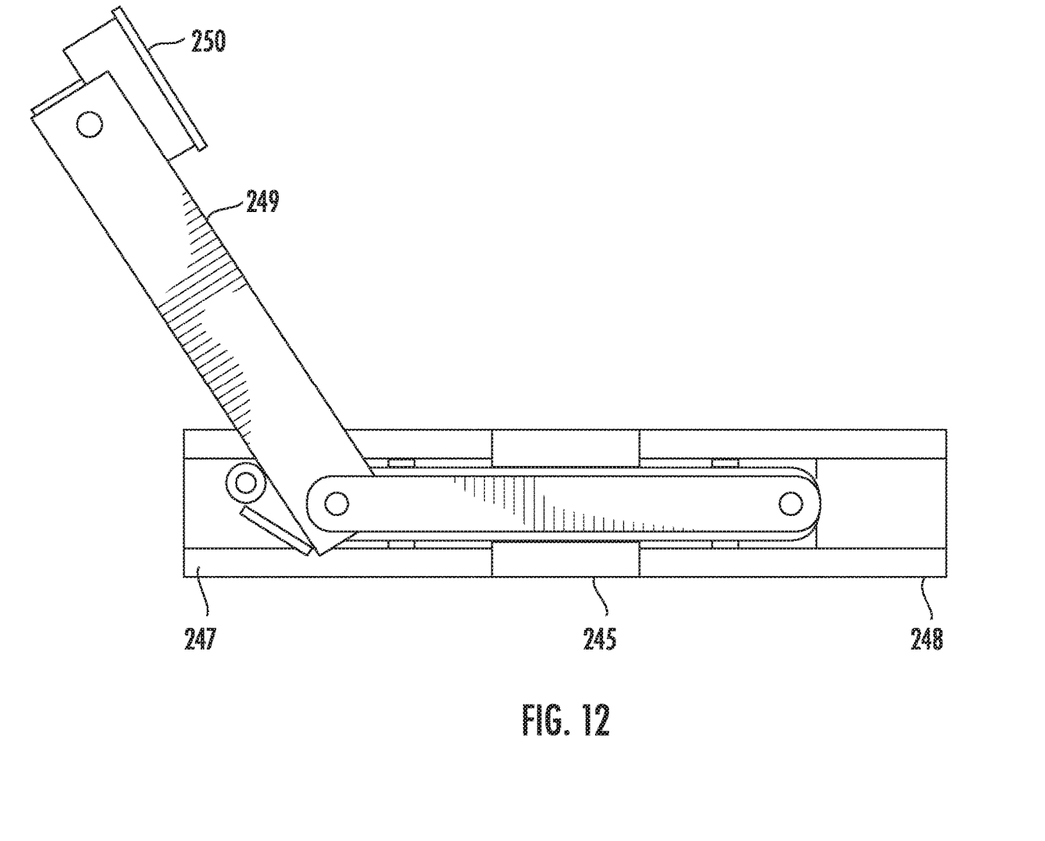
FIG. 12 is a partial top view of the clamp mechanism of FIGS. 10 and 11.

An I-beam, or other column can be securely held in position to the adapter by providing a clamp mechanism 240. Clamp mechanism 240 includes brackets 242 and 243 extending upwardly from a base member 245 having opposing ends 247 and 248. Bracket members 242 and 243 are coupled to the sonic drilling apparatus so as to position base 245 adjacent the adapter, such as adapter 215. A pivoting clamp arm 249 is pivotally coupled to base 245 adjacent end 247 and movable between a clamped position wherein arm 249 is pivoted inwardly, and an unclamped position wherein arm 249 is pivoted outwardly. Pivotal movement is enabled by any conventional mechanism, such as double acting pistons, either pneumatic or hydraulic, or other types of actuators. Clamp arm 249 includes a pressure foot 250 coupled to a terminal end thereof. In the clamped position, pressure foot 250 of arm 249 engages the column coupled to the adapter, securely holding the column to the adapter. While a single arm 249 is illustrated in this embodiment, it will be understood that another, opposing arm, can be carried at end 248 of base 245 to increase the security of coupling between the column and the adapter.

Figure 13:
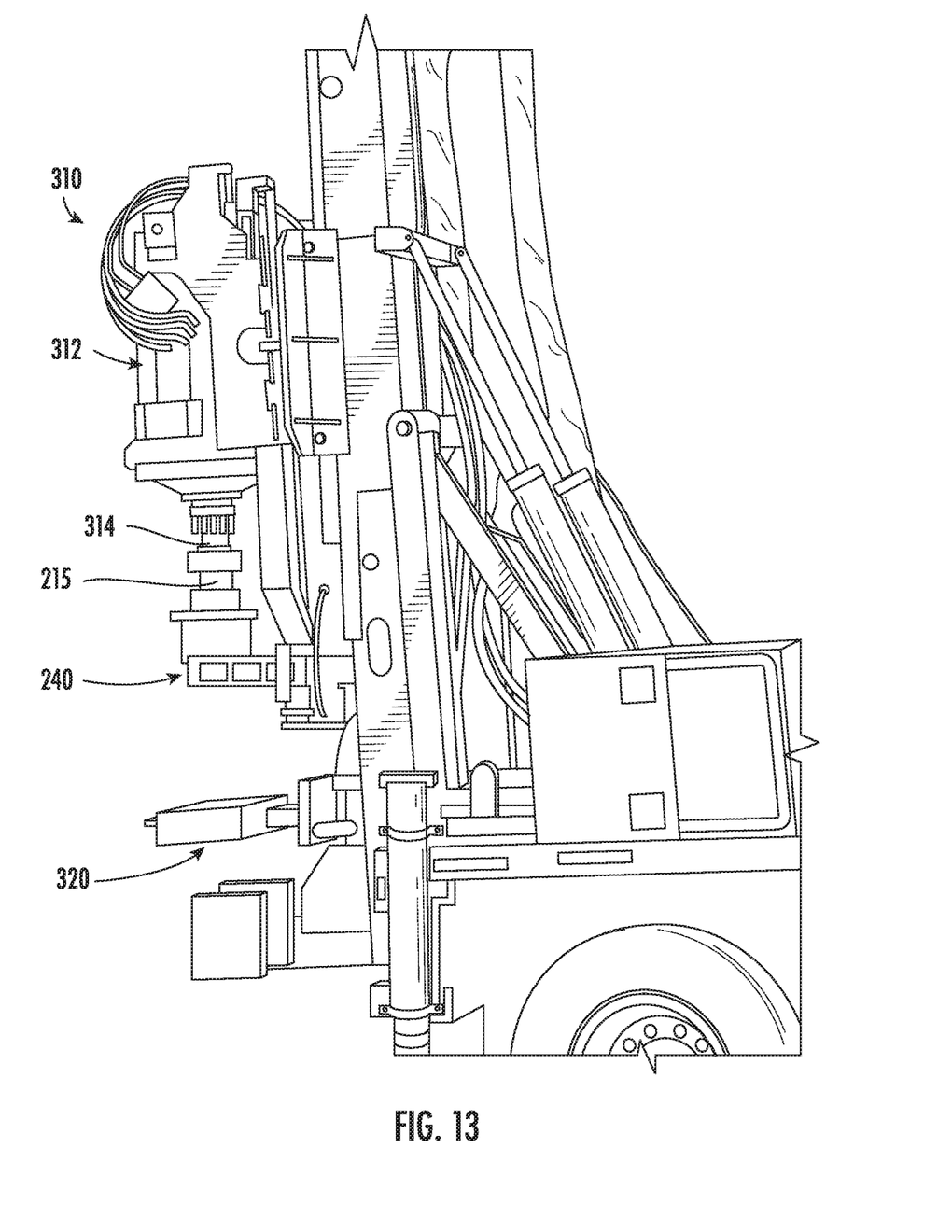
FIG. 13 is a perspective view of a sonic drilling apparatus according to the present invention.

Turning now to FIG. 13 a perspective view of a sonic drilling apparatus 310, according to the present invention is illustrated. Sonic drilling apparatus includes an orbiting mass oscillator 312, or like mechanism for causing vibrational waves, and a flange fitting 314 for coupling with an adapter such as adapter 215, to attach a column to apparatus 310. While the orbiting mass oscillator 312 operates in a conventional manner, it does not rotate as a conventional sonic drill requires. Apparatus 310 further includes a clamp mechanism 240 as described previously and a centering assembly 320.

Figure 14:
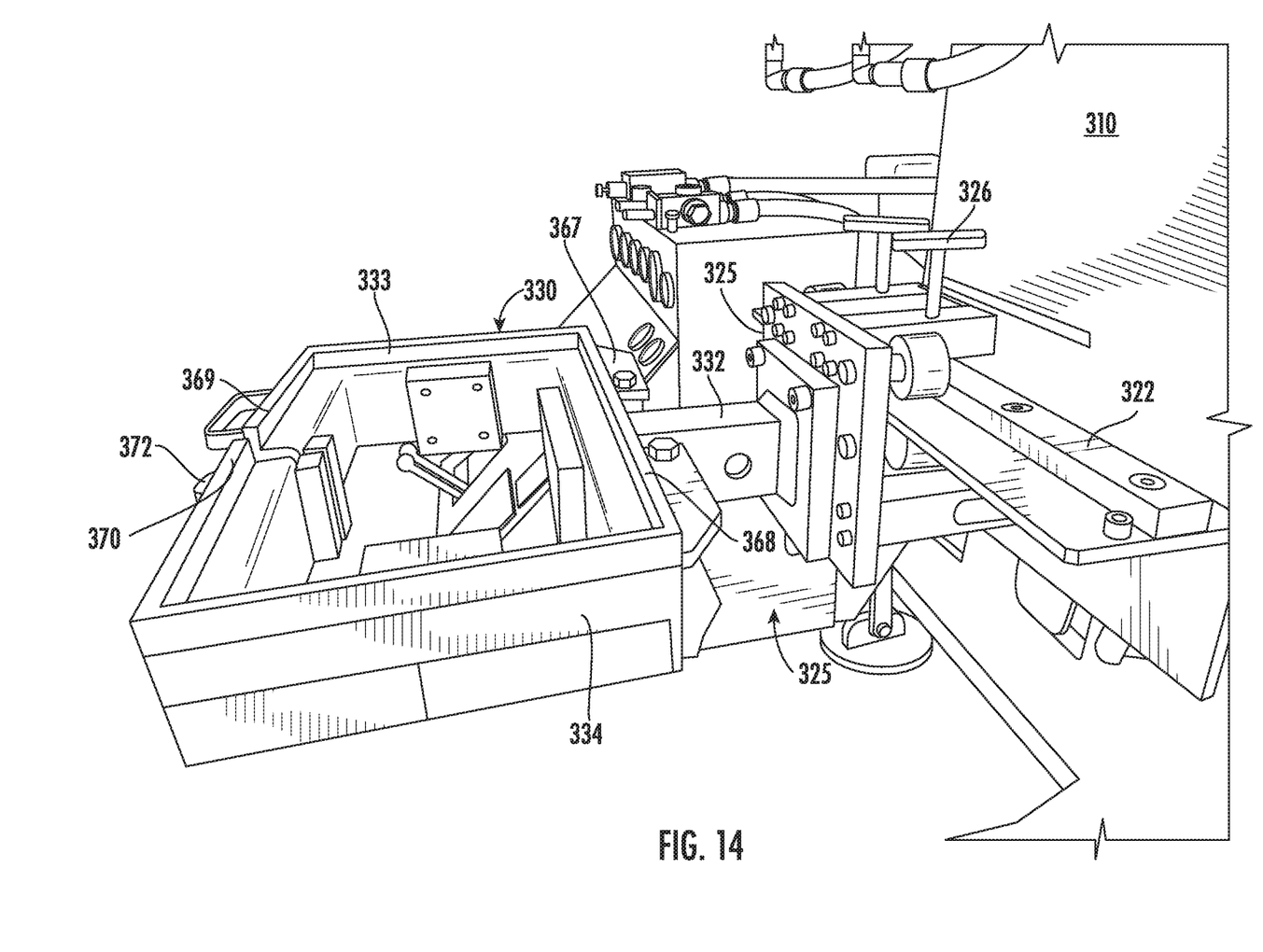
FIG. 14 is a partial perspective view illustrating a centering assembly according to the present invention.
Figure 15:
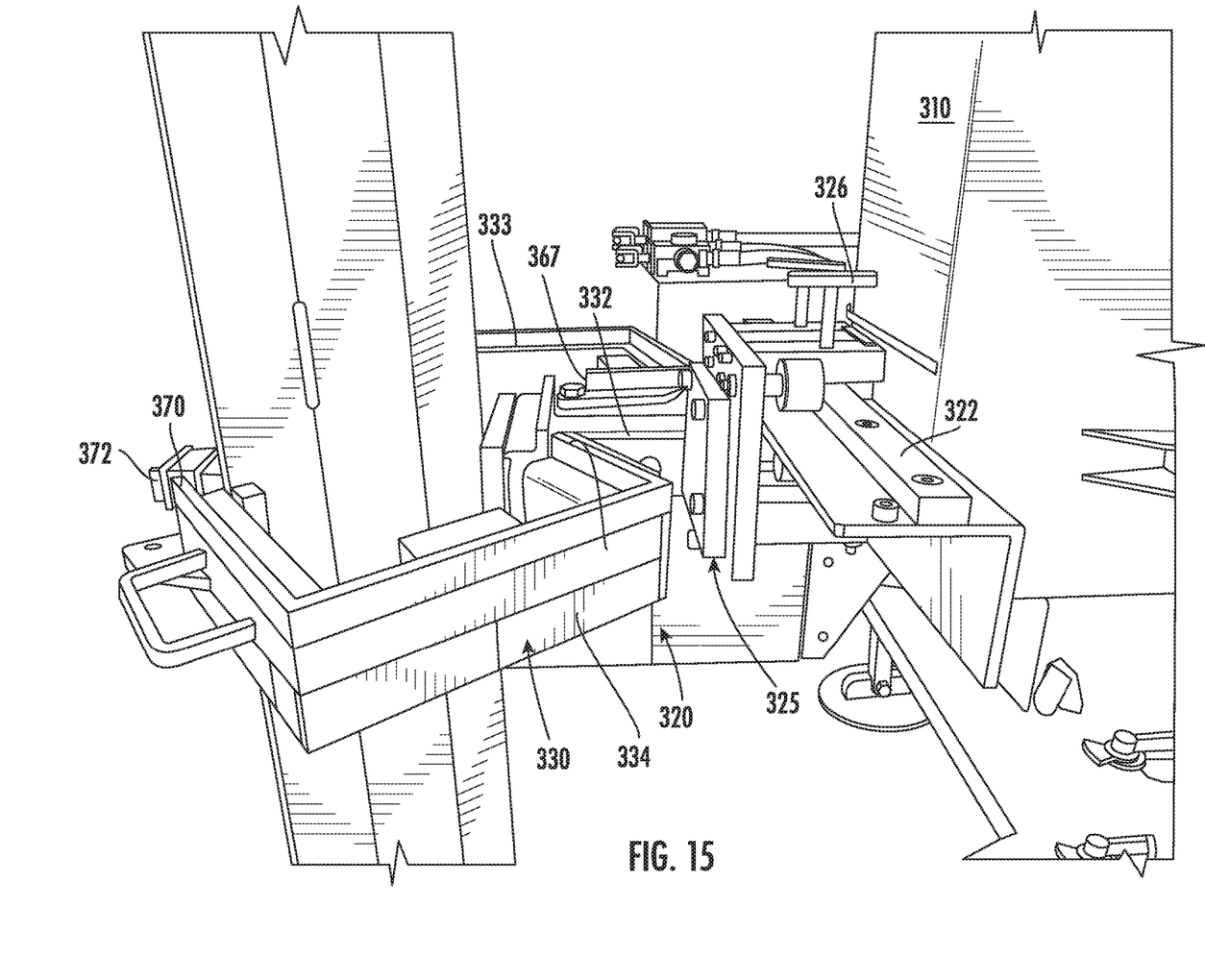
FIG. 15 is a partial perspective view illustrating the centering assembly of FIG. 14 in an open position preparatory to enclosing a column.

Referring now to FIGS. 14 and 15, centering assembly 320 includes a track 322 carried by sonic drill apparatus 310 underlying and spaced from clamp mechanism 240. Track 322 extends horizontally and receives a carriage 325 thereon for reciprocal movement laterally therealong. Carriage 325 is normally freely moveable laterally along track 322, until the desired position is achieved, then carriage 325 can be locked in position on track 322 by set screws 326. Carriage 325 supports a centering frame 330 extending outwardly therefrom. Centering frame 330 includes a base 332 coupled to and extending from carriage 325, and a half portion 333 and a half portion 334. Half portions 333 and 334 are each pivotally coupled at an end 367 and 368, respectively, to base 332. In this embodiment, half portions 333 and 334 combine to form a parallelogram defining an interior void shaped to engage the sides of a column. Half portions 333 and 334 are pivotally movable between an open position (FIG. 15) wherein half portions 333 and 334 are pivoted outwardly, and a closed position (FIG. 14) wherein half portions 333 and 334 are pivoted inwardly until distal ends 369 and 370, thereof, respectively, abut and can be retained by a closure mechanism 372, such as a latch. In the open position, as shown in FIG. 15, a column can be positioned within centering frame 330. The centering frame is then moved to the closed position, capturing the column therein and providing support to prevent lateral movement of the column, while allowing vertical movement of the column therein. During the emplacement operation of sonic drill apparatus 310, a column being emplaced can move laterally from the desired location unless adequately restrained by centering assembly 320 with carriage 325 locked into position. Lateral positioning movement of orbiting mass oscillator 312, adapter 215 and therefore the column, can be accommodated by unlocking centering assembly 320. With carriage 325 free to move laterally along track 322, centering frame 330 can be positioned in the correct position by movement of the column. When correctly positioned, carriage 325 is then locked to track 322. In this manner, column can be emplaced in a desired location and prevented from shifting or tilting.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A method of emplacing a column comprising the steps of:
   providing a sonic drilling apparatus generating vibrational waves and including a fitting;
   providing an adapter coupled to the fitting for removably attaching a column to the sonic drill apparatus;
   providing a centering assembly positioned below the adaptor and laterally adjustable in relation thereto, for receipt of a column therethrough;
   providing a track carried by the sonic drill apparatus;
   providing a carriage carried by and reciprocally moveable along the track;
   providing a centering frame including a base coupled to and extending from the carriage;

providing a column;
attaching the adapter to the column;
positioning the centering assembly around the column to prevent lateral movement thereof; and
driving the column into a supporting substrate to a depth sufficient to provide stability to the column.

2. A method of emplacing a column as claimed in claim 1 wherein the column is one of a tubular polygonal column and an I-beam.

* * * * *